(12) United States Patent
Motoyama (10) Patent No.: US 6,412,121 B2
(45) Date of Patent: Jul. 2, 2002

(54) THERMO-EVAPORATION TYPE TOILET SYSTEM

(75) Inventor: Teizo Motoyama, Kawaguchi (JP)

(73) Assignee: MTEKS Co., Ltd., Kawaguchi (JP)

( * ) Notice: Subject to any disclaimer, the term of this patent is extended or adjusted under 35 U.S.C. 154(b) by 0 days.

(21) Appl. No.: 09/864,975

(22) Filed: May 24, 2001

(30) Foreign Application Priority Data

May 29, 2000 (JP) ........................................ 2000-158856

(51) Int. Cl.$^7$ ................................................ E03D 9/10
(52) U.S. Cl. ........................ 4/318; 4/317; 4/319; 4/320; 4/322; 4/DIG. 19
(58) Field of Search ............................ 4/317, 318, 319, 4/320, 321, 322, 111.1, 111.2, 111.5, 111.6, DIG. 17, DIG. 19

(56) References Cited

U.S. PATENT DOCUMENTS 3,190,725 A * 6/1965 Van Den Berg ............ 4/322 X
3,700,565 A * 10/1972 Cornish et al. ............. 4/317 X
3,733,617 A * 5/1973 Bennett ...................... 4/318 X
3,950,249 A * 4/1976 Eger et al. .................. 4/318 X
5,068,926 A * 12/1991 Suzuki .......................... 4/318

OTHER PUBLICATIONS

Patent Abstracts of Japan, 10204960A, JP Appln. No. 09007409, Published Aug. 4, 1998, 1 pg.
Patent Abstracts of Japan, 11047797A, JP Appln. No. 09245882, Published Feb. 23, 1999, 1 pg.
Patent Abstracts of Japan, 2000023877A, JP Appln. No. 10196185, Published Jan. 25, 2000, 1 pg.

* cited by examiner

Primary Examiner—Robert M. Fetsuga
(74) Attorney, Agent, or Firm—Dilworth & Barrese, LLP (57) ABSTRACT

In fuller detail, the present invention relates to a thermo-evaporative type toilet system designed so that the excrement collected from the toilet is treated with effective microorganisms and heated for evaporation to generate vapors, with the stench being removed from said vapors and the water recovered from the vapors being purified for reuse as purified water.

4 Claims, 7 Drawing Sheets

THERMO-EVAPORATION TYPE TOILET SYSTEM

FIELD OF THE INVENTION

In fuller detail, the present invention relates to a thermo-evaporative type toilet system designed so that the excrement collected from the toilet is treated with effective microorganisms and heated for evaporation to generate vapors, with the stench being removed from said vapors and the water recovered from the vapors being purified for reuse as purified water.

DESCRIPTION OF THE PRIOR ART

A familiar example of the prior state of the art is a toilet system in which both the excrement and purified water retained in a waste tank are jointly purified and recovered and the water is used as purified water for flushing the toilet.

The familiar toilet system was designed in such a manner that the excrement discharged into the toilet was sent to a waste tank by opening a shutter provided at the bottom of the toilet and said excrement stored therein was sent further to an incineration boiler in which said excrement was stirred by rotor blades kept in rotary motion for incineration, with the incineration boiler being heated by some appropriate means such as an electric heater.

The stench generated during incineration of the excrement was then led to a filtration chamber while the recovered water was recycled as flushing water for the toilet. The stench components not dissolving in water were deodorized in a deodorizing chamber.

After the excrement had been incinerated, the electric heater was switched off to allow the temperature of the incineration boiler to drop to a certain extent whereupon the water was fed into the incineration boiler and the electric heater was again switched on to heat the water inside the incineration boiler, with the rotor blades being rotated in this condition to cause elliptically 3 shaped steel spheres to move. These oval-shaped spheres were used for the purpose of scraping off any residual materials such as salts adhering to the peripheral and bottom walls of the incineration boiler and causing them to be dissolved in the hot water.

After this, the electric heater was switched off and after the temperature of the hot water had dropped the residues, including salts, in the incineration boiler were sent to an ash filtration unit while causing the rotor blades to rotate, with said residues being separated by filtration into an ash portion and water, the ash being discharged from the system and the water being purified again for recycling as flushing water for the toilet.

Problems to be Surmounted by the Invention

In the incineration of excrement it is generally difficult, however, to eliminate the stench effectively and achieve a favorable efficiency unless the excrement is disintegrated to a certain small and uniform size.

The conventional toilet system, however, did not use effective microorganisms in a scientific manner and its deodorizing mechanism was equally not adequate. As a result, the collected excrement was not properly deodorized. Furthermore, as the excrement had not been reduced to a uniform small size it was not possible to achieve complete incineration.

The conventional toilet systems did not pre-treat the excrement prior to incineration but sent it directly to the incineration boiler so that, as a result, it took time for the excrement to be incinerated even though the incineration boiler's rotor blades were kept rotating and the stench worsened still further due to the excrement's being heated. Moreover, when the incineration boiler was in use, it was not possible to send additional excrement to the incineration boiler even though the discharge tank was full with excrement. In consequence, the system also had the serious disadvantage that it was not even possible to use the toilet in this situation until the incineration process was completed in the incineration boiler.

Since it was not possible to incinerate excrement in an efficient manner the incineration of excrement tended to be incomplete and residual excremental matter would easily build up on the inner walls and the bottom of the incineration boiler after incineration, necessitating the use of oval-shaped spheres set in motion by rotor blades to achieve a stirring action for removing the residual excremental accretion building up in the boiler.

The use of the oval-shaped spheres had the risk of causing damage to the incineration boiler and it was also necessary to operate the electric heater to full capacity in order to incinerate the excremental matter, so that, as a result, the problem would arise that both the electric heater and the incineration boiler had a short service life.

SUMMARY OF THE INVENTION

Wherefore the present invention proposes a thermo-evaporative type toilet system to resolve the above problems by making use of the power of water and air bubbles in disintegrating and stirring the excremental matter and by using, furthermore, effective microorganisms for eliminating stench with the application of heat for evaporation.

Means of Surmounting the Problems

As a means of surmounting the problems associated with this invention, the system described in claim 1 is such that, first, the said thermo-evaporative type toilet system is characterized in that said thermo-evaporative type toilet system, in which the excrement collected from the toilet is heated for evaporation with generation of stench, said stench is removed from the vapors and water is regenerated from the vapors and purified to obtain purified water, with said purified water being re-circulated by way of reuse, is provided with a fluidizing type tank in which the excrement collected from the toilet is disintegrated to a predetermined size, an evaporation boiler that accepts the excrement after disintegrating and deodorizing in said fluidizing type tank, and a first deodorizer pipe which accepts the vapors and stench sent from said evaporation boiler, and a filtration tank at the front-end of said first deodorizing pipe, while a second deodorizing pipe designed to discharge the air in the filtration tank and a first and second discharge pipe are provided at the front-end of the filtration tank and a return pipe designed to return the water in the filtration tank to said toilet is connected to the filtration tank in such a manner that effective microorganisms capable of removing the stench are introduced into the aforesaid fluidizing type toilet tank.

In accordance with this invention the thermo-evaporative type toilet system consists of a fluidizing type tank in which the excrement collected from the toilet is disintegrated to a predetermined size for evaporation by heating in an evaporation boiler that accepts the excrement after disintegrating. It is therefore sufficient to evaporate the excremental matter in the evaporation boiler after it has been reduced to a predetermined size so that, as a result, the excrement can be evaporated efficiently without requiring significant time.

Wherefore, when the time during which the evaporation boiler is kept in the empty condition is relatively long and the fluidizing type tank is full with excrement it is possible for excrement to be sent from the fluidizing type toilet tank to the evaporation tank immediately.

Since, furthermore, effective microorganisms capable of removing stench are used in accordance with this invention it is possible to achieve an effective deodorizing treatment.

According to claim 2, the thermo-evaporative type toilet system is characterized in that the aforesaid excrement is stored in a cylindrical container and sprayed together with water from the walls of said container causing said excrement and water to revolve along the walls of said container and be disintegrated to a predetermined size.

By causing the excrement to revolve along the wall of said container while adding water thereto in order to soften the excremental matter it is possible to disintegrate the excremental matter to the predetermined size in an efficient manner.

Due to the use of water for stirring the excremental matter the fluidizing type tank will not sustain damage, nor is any problem of operating failure likely to occur as no mechanical systems such as rotating parts are used.

According to claim 3, the aforesaid evaporation boiler is characterized in that the excremental matter that has been disintegrated in the fluidizing type tank is stored in the boiler volume and evaporated by heating the stored excrement.

Since the system is designed so that the excrement disintegrated in the fluidizing type tank is supplied to the evaporation boiler it is possible to evaporate the excrement by heating in an efficient manner without any residues accumulating.

As, furthermore, it is not necessary to stir the excremental matter with steel spheres there is no risk of causing damage to the evaporation boiler.

According to claim 4, the system is characterized in that the aforesaid toilet can be replaced with a hopper. By replacing the toilet with a hopper it is possible to extend the scope of use and the application range.

DESCRIPTION OF THE PREFERRED EMBODIMENTS

Practical Embodiments of the Invention

Figure 1:
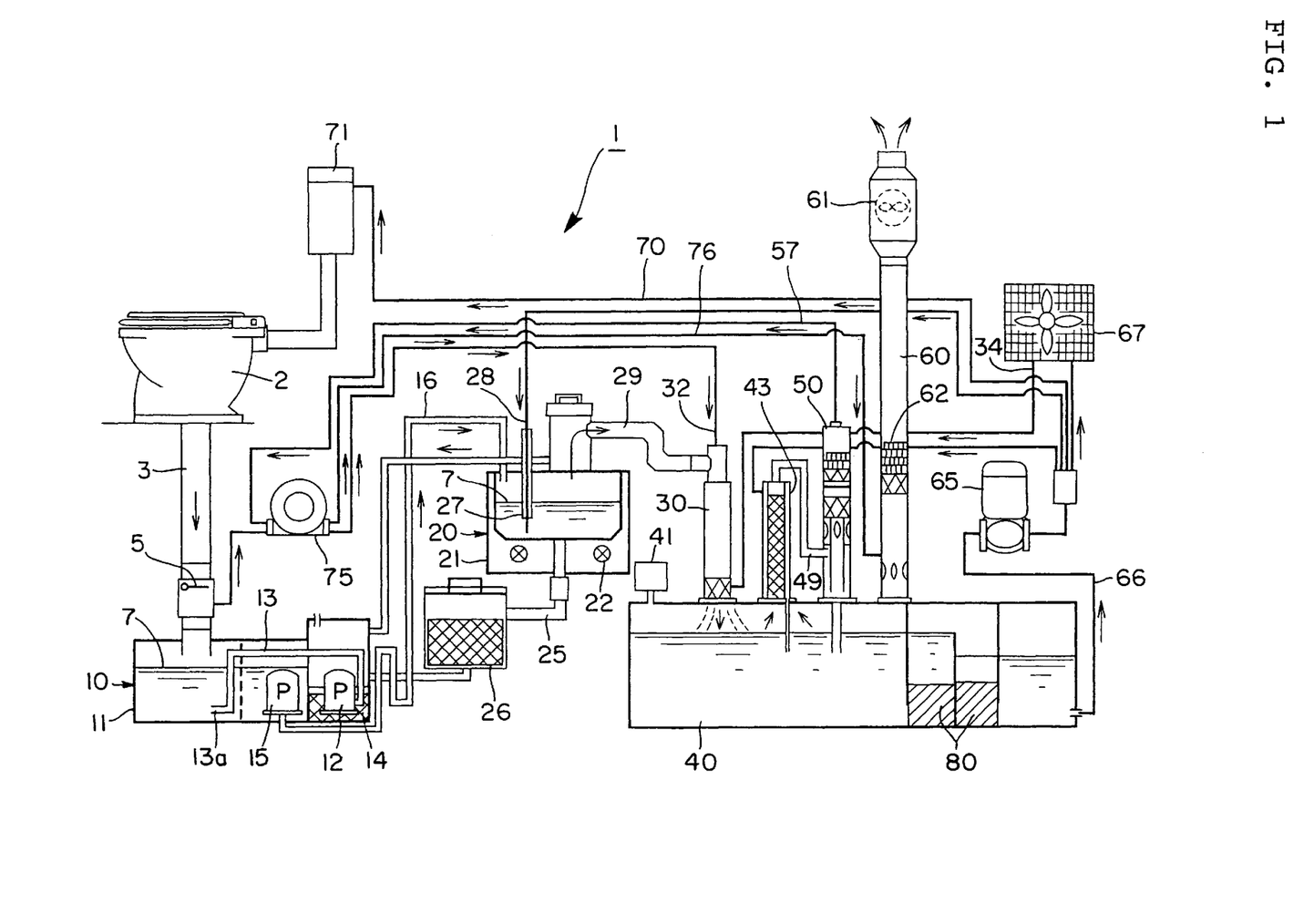
FIG. 1: This is an overall view showing the thermo-evaporative toilet system in accordance with this invention.
Figure 2:
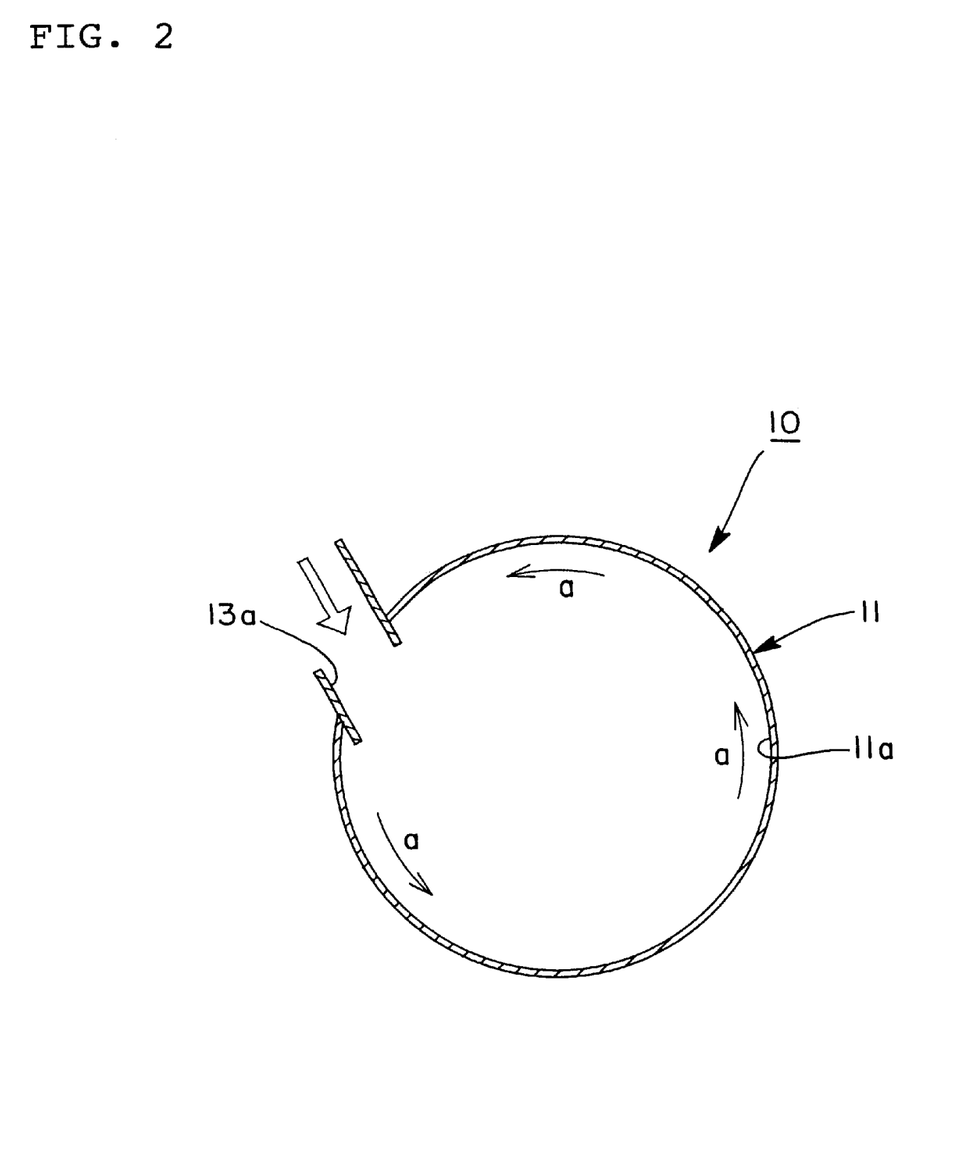
FIG. 2: This is a plan view showing the fluidizing type toilet tank of the thermo-evaporative toilet system in accordance with this invention.
Figure 3:
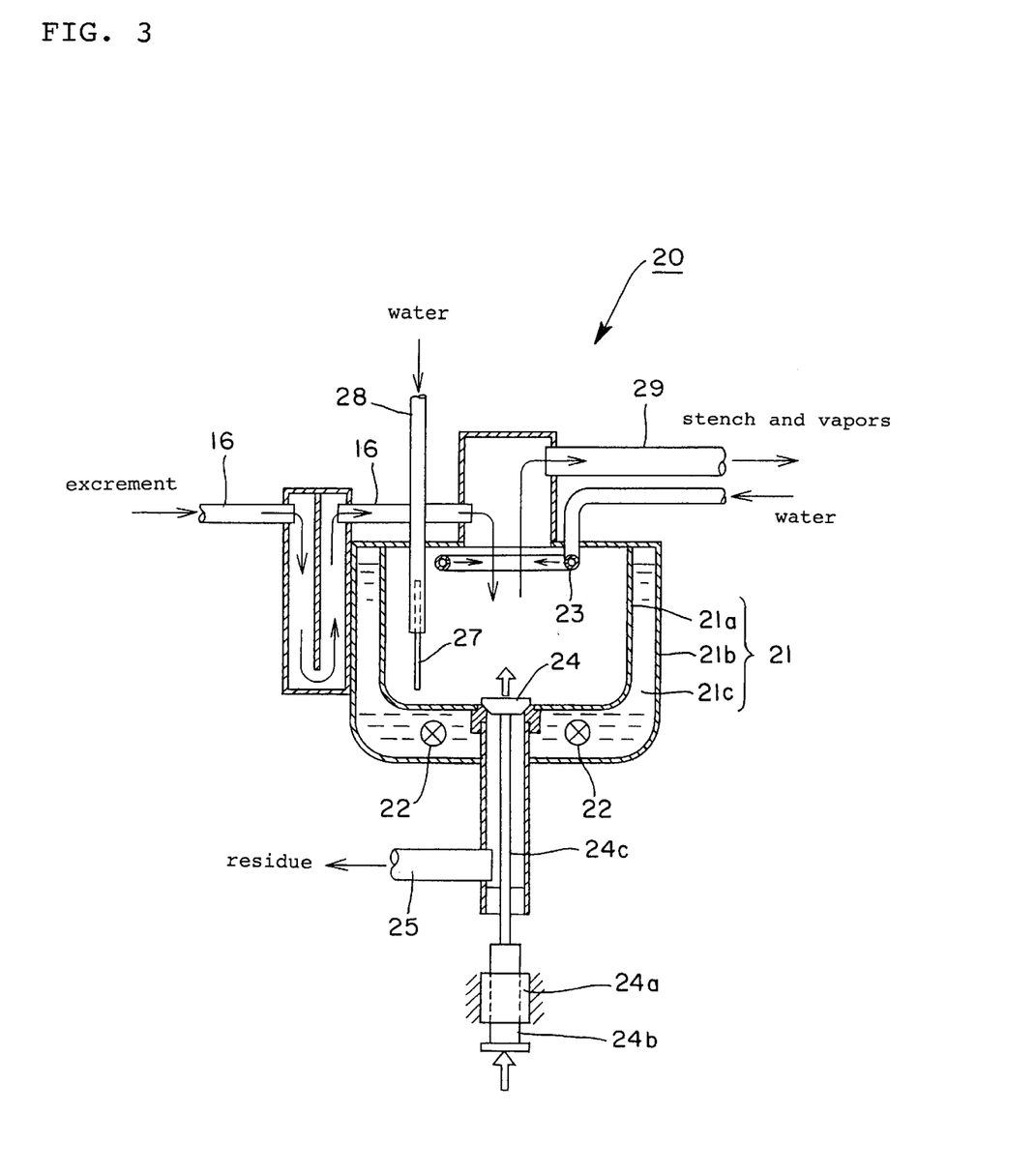
FIG. 3: This is a cross-section view showing the evaporation boiler of the thermo-evaporative toilet system in accordance with this invention.
Figure 4:
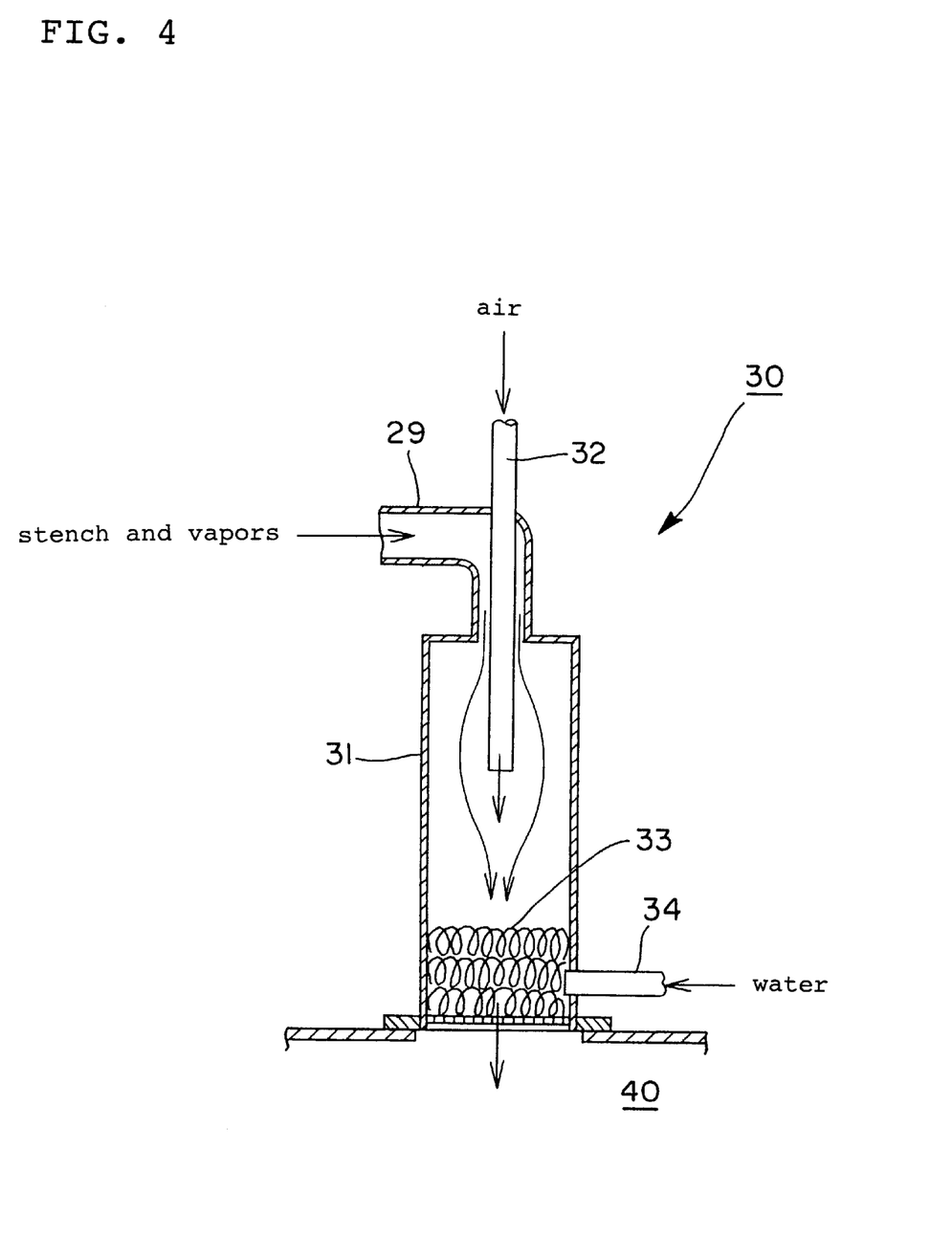
FIG. 4: This is a cross-section view showing the first deodorizing pipe of the thermo-evaporative toilet system in accordance with this invention.
Figure 5:
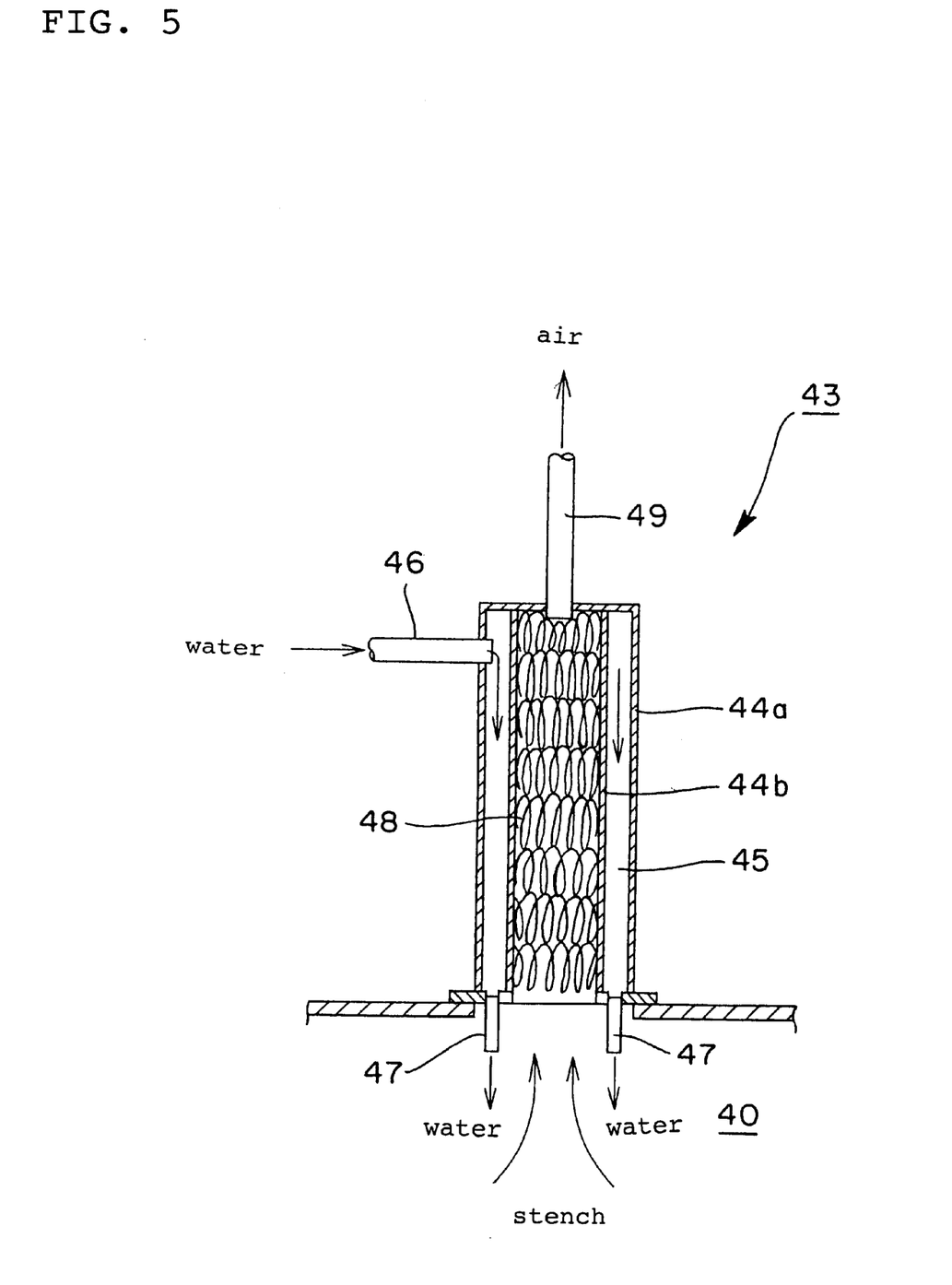
FIG. 5: This a cross-section view showing the second deodorizing pipe of the thermo-evaporative toilet system in accordance with this invention.
Figure 6:
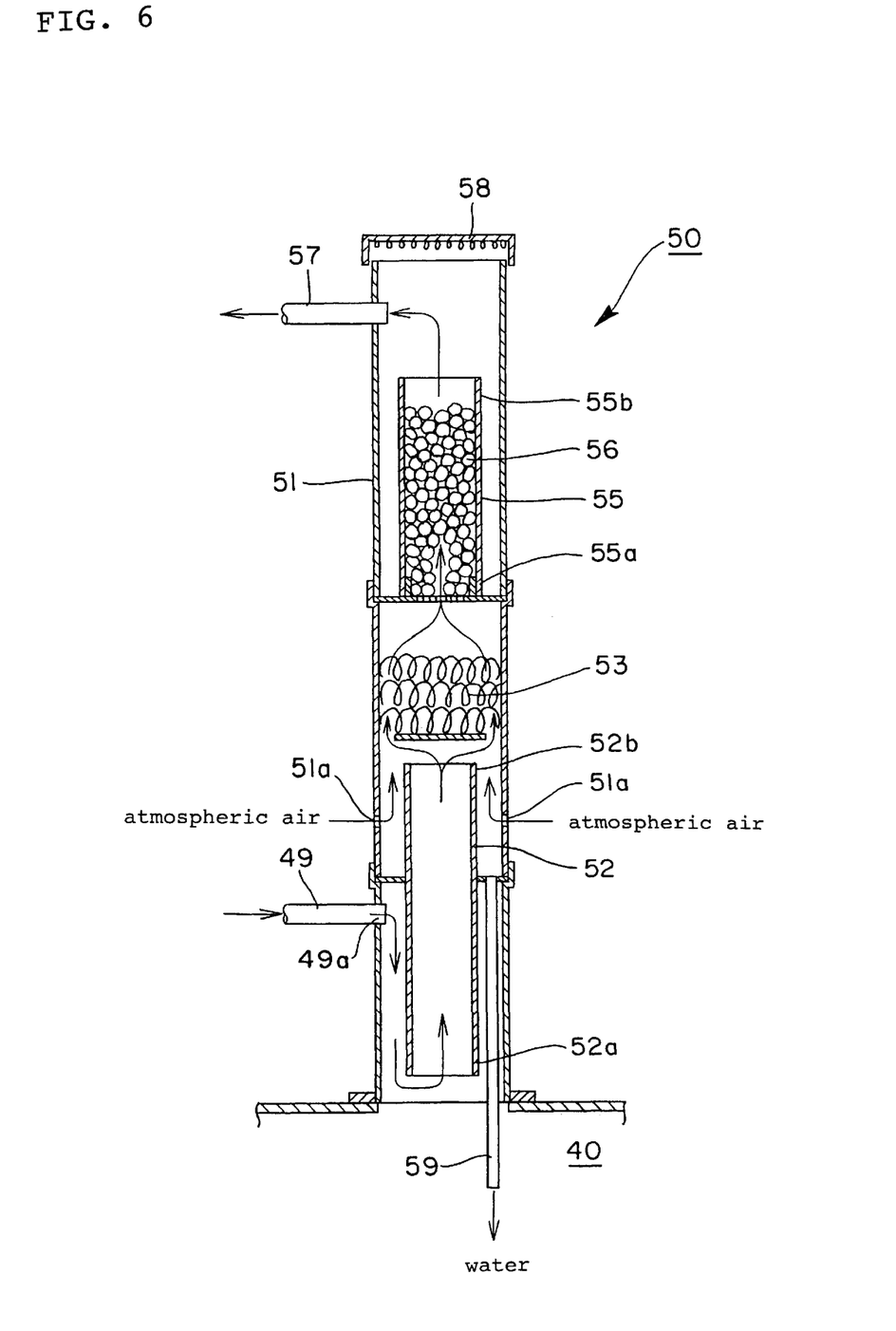
FIG. 6: This is a cross-section view showing the first discharge pipe of the thermo-evaporative toilet system in accordance with this invention.

FIG. 1 is an overall view showing the thermo-evaporative toilet system in accordance with this invention, FIG. 2 a plan view showing the fluidizing type toilet tank of the thermo-evaporative toilet system in accordance with this invention, FIG. 3 a cross-section view showing the evaporation boiler of the thermo-evaporative toilet system in accordance with this invention, FIG. 4 a cross-section view showing the first deodorizing pipe of the thermo-evaporative toilet system in accordance with this invention, FIG. 5 a cross-section view showing the second deodorizing pipe of the thermo-evaporative toilet system in accordance with this invention, and FIG. 6 a cross-section view showing the first discharge pipe of the thermo-evaporative toilet system in accordance with this invention.

As shown in FIG. 1, the thermo-evaporative toilet system 1 in accordance with this invention consists of the toilet unit (toilet) 2, a butterfly shutter 5 attached to the discharge pipe 3 of the toilet 2, a fluidizing type toilet tank 10 in which the excremental matter 7 descending from said discharge pipe 3 is disintegrated or reduced in size, a sewage water delivery pump 15 feeding the excrement 7 of the fluidizing type toilet tank 10 to the evaporation boiler 20, an evaporation boiler 20 in which the disintegrated excrement 7 reduced in size in the fluidizing type toilet tank 10 is heated and evaporated, a first deodorizing pipe 30 into which the stench and vapors generated in said evaporation boiler 20 are admitted for evaporation, a filtration tank 40 for storing the stench and vapors that have passed through the first deodorizing pipe 30 and for cleaning the stench-containing water for reuse, as well-as a second deodorizing pipe 43 in which the air sent from the filtration tank 40 is deodorized and a first discharge pipe 50 for the final discharge of the air that has been deodorized in said second deodorizing pipe 43.

The butterfly shutter 5 is a spring-actuated shutter that is normally kept in the closed condition but opens under spring pressure in response to the spring force when the volume (weight) of the excrement 7 and flushing water exceeds a predetermined value. Instead of the spring-operated shutter, the butterfly shutter 5 may also be an electromagnetic (solenoid) shutter that is normally maintained in the closed condition and opens when actuated by a volume detection sensor (not shown) when the volume of the excrement 7 exceeds a certain predetermined value.

In the fluidizing type toilet tank 10 (see also FIG. 2), the excrement 7 is disintegrated and reduced to a predetermined size by a process in which said excrement 7 is stored in a cylindrical container 11, a circulation circuit 13 is connected from the sewage water circulation pump 12, said excrement and the flushing water is sprayed onto the walls 11a of container 11 from a spray nozzle 13a in the circulation circuit 13 and the excrement 7 is caused to revolve in the direction of arrow a along the wall 11a of container 11.

Furthermore, the fluidizing type toilet tank 10 removes stench, including ammonia, by using effective microorganisms such as, for example, the bacterial strain BSK (tradename) to destroy *coli* bacteria which are responsible for stench through the generation of bacteria.

With the fluidizing type toilet tank 10, excrement and flushing water are sprayed into container 11 from spray nozzles 13a and because the excrement 7 is thereby stirred in container 11 said fluidizing type toilet tank 10 will not be exposed to the risk of damage.

Foreign matter other than excrement enters the receiving basket 14 for foreign matter for subsequent removal.

The sewage water delivery pump 15 feeds the excrement 7 of the fluidizing type toilet tank 10 via a feed pipe 16 to the evaporation boiler 20.

The boiler unit 21 of the evaporation boiler 20 (see also FIG. 3) consists of an inner boiler 21a and an outer boiler 21b, with an electric heater 22 provided between the inner boiler 21a and the outer boiler 21b while the gap between the inner boiler 21a and the outer boiler 21b is filled with oil 21c, with a water shutter 23 provided at the top and a discharge valve 24 that drains off residues at the bottom.

Said discharge 24 opens and closes through rod 24c in that a runner 24b is moved by the electromagnet 24a.

The evaporation boiler 20 is designed so that the excrement 7 that has been disintegrated in the fluidizing type toilet tank 10 is stored in the evaporator 21 and heated by heater 22 for evaporation, with the resulting stench and vapors being discharged through air feed pipe 29 and the residues deposited at the bottom being drained off from discharge valve 24 for collection and storage in the residue collecting basket 26 via residue discharge pipe 25.

Since, with the evaporation boiler 20, the excrement 7 that has been disintegrated to the predetermined size in the fluidizing type toilet tank 10 is evaporated by heating it is possible to heat and evaporate the excrement 7 in an efficient manner without requiring significant time.

Since the time during which the evaporation boiler 20 remains in the empty condition is therefore relatively long it follows that when the fluidizing type toilet tank 10 is full with excrement 7 it is possible to send excrement 7 immediately from the fluidizing type tank 10 into the evaporation boiler 20. It is therefore possible to use the toilet at any time.

As the electric heater 22 of the evaporation boiler 20 operates at low temperatures, the evaporation boiler 20 and the electric heater 22 will not be liable to damage, and it is possible, furthermore, to achieve a long service life for said boiler 20.

Moreover, the evaporation boiler 20 is equipped with a residue volume detection sensor 27. The purpose for which the residue volume detection sensor 27 is used is to detect the upper and lower limit volumes of excrement 7 retained in the evaporation boiler 20. With the use of said sensor 27 for detecting the upper and lower limits of and thanks to the use of nighttime electric energy it is possible to achieve low-cost efficiency for the thermal evaporation. The residue volume detection sensor 27 is flushed and cleaned with water from the flush water pipe 28.

The first deodorizing pipe 30 (see also FIG. 4) is provided with a cylinder 31 which receives from the air feed pipe 29 the vapors and stench generated by heating the excrement 7 in the evaporation boiler 20, with said cylinder 31 supplying air from the air feeding pipe 32 at the top in order to facilitate the flow of the vapors while the stench is deodorized in the metal filter 33 at the bottom of the cylinder 31 to permit the flow of the vapors to the filtration tank 40.

Furthermore, a cooling water feed pipe 34 is provided at the bottom of the cylinder 31 so that as a result of the cooling water's being fed from the cooling water feed pipe 34, it is possible to cool both the metal filter 33 and the vapors.

Filtration tank 40 is provided with container 41 containing effective microorganisms such as, by way of example, the bacterial strain *Bacillus subtilis* Kubota (BSK) (tradename) and serves to clean for reuse the water that has passed through the first deodorizing pipe 30 and the water containing the stench after deodorizing in the second deodorizing pipe 43 with the bacterial strain BSK.

It is desirable in this case to use as the effective microorganisms a strain as indicated in Patent Laid-open HEISEI 1 (1989)-144971 with a sewage water purifying and deodorizing action.

The second deodorizing pipe 43 (see also FIG. 5) has a double structure consisting of an outer cylinder 44a and an inner cylinder 44b, being provided with a water feed pipe 46 supplying water to the empty space 45 between the outer cylinder 44a and the inner cylinder 44b and provided also with a pipe 47 conducting the water in said empty space 45 to the filtration tank 40, with a metal filter 48 being provided in the inner pipe 44b.

In this manner, the stench admitted from the filtration tank 40 is deodorized by passing through the metal filter 48 and the deodorized (stench-containing) air is sent to the air feed pipe 49.

The first discharge pipe 50 (see also FIG. 6) is such that the (stench-containing) air flows from the discharge hole 49a of the air feed pipe 49 in the outer cylinder 51, with said stench flowing from the bottom end 52a into the lower inner cylinder 52 and the stench that has flown from the top end 52b of the lower inner cylinder 52 being deodorized in the metal filter 53 while the deodorized stench flows from the bottom end 55a into the upper inner cylinder 55 and after it has been deodorized with activated carbon 56 it then flows from the top end 55b of the upper inner cylinder 55 into the air feed pipe 57.

The water drops formed by dew condensation on the lid 58 at the front end of the discharge pipe 50 fall downward and are returned to the filtration tank 40 through the condensation return pipe 59.

The outer cylinder 51 consists of a plural number of (atmospheric) air suction holes 51a.

The second discharge pipe 60 discharges the stench air in the odorless condition after it has been sucked into the filtration tank 40 by operating the fan 61 at the front end and deodorized with activated carbon 62.

Further, the detail 65 is a water feed pump, and said water feed pump 65 sucks the regenerated water that has been purified in filtration tank 40 through the suction pipe 66 and, after said regenerated water has been cooled in radiator 67, supplies the cooled water through the cooled-water feed pipe 34 to the first deodorizing pipe 30.

Moreover, said water feed pump 65 supplies the water in the filtration tank 40 through the water feed pipe 46 to the second deodorizing pipe 43 and then conducts the water, for reuse as recycled water for flushing the toilet 2, through the return pipe 70 to the storage tank 71 in which the recycled water is stored for flushing the toilet.

Furthermore, the water feed pump 65 also supplies water to the flushing pipe 28 for flushing the residual volume detection sensor 27.

The air blower 75 supplies the stench from the discharge pipe 3 and the air feed pipe 57 through the air feeding pipe 32 to the first deodorizing pipe 30 and through the air feed pipe 76 to the second discharge pipe 60, respectively.

The detail 80 is activated carbon which is used for purifying the water in the filtration tank 40.

Figure 7:
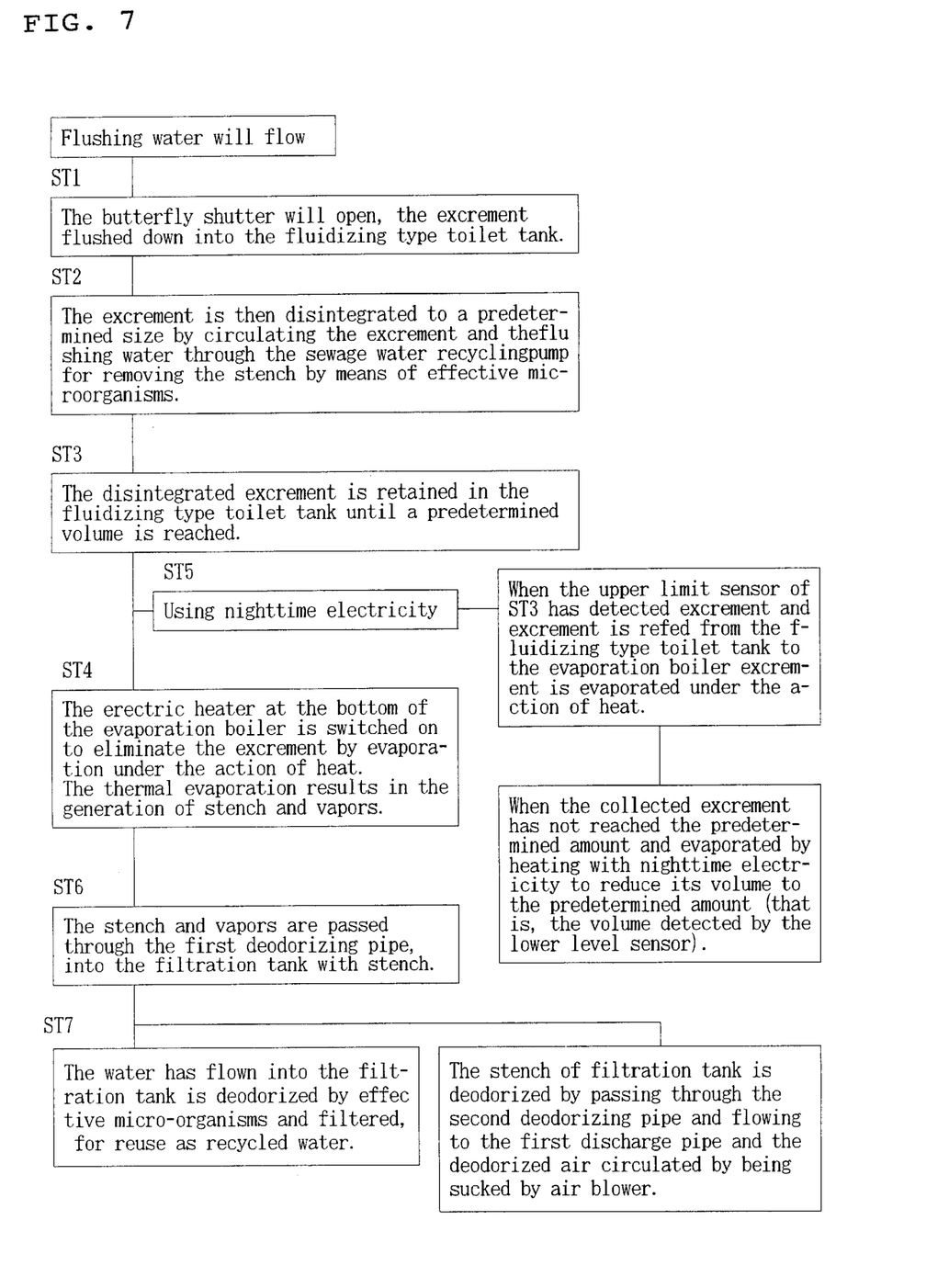
FIG. 7: This is the flowchart explaining the function of the thermo-evaporative toilet system in accordance with this invention.

The following explanations describe the operation of the thermo-evaporative type toilet system 1 on the basis of, and by making reference to, the flowchart shown in FIG. 7. Step (the word Step is abbreviated to as ST in the following) 1: After defecation or urination, flushing water (approx. 350 cc) will flow when the push-button (not shown) is pressed. The spring-operated shutter 5 will open in response to the spring action when the volume of the excrement 7 and flushing water has exceeded a certain predetermined value to flush down the excrement 7 and flushing water into the fluidizing type toilet tank 10.

ST2: The excrement 7 flushed down into the fluidizing type toilet tank 10 is then disintegrated to a predetermined size by circulating the excrement 7 and the flushing water through the sewage water recycling pump 12 for removing the stench by means of effective microorganisms.

ST3: The disintegrated excrement 7 is retained in the fluidizing type toilet tank 10 until a predetermined volume is reached (the capacity being equivalent to the excrement volume of approximately 120 persons (or roughly 10 liters)) and when the capacity level has been reached the upper limit sensor (not shown) detects the upper limit level of the excrement 7. The upper limit sensor thereupon causes a signal to be transmitted to operate the sewage water feed pump 15 to pump the 10 liters of excrement 7 into the evaporation boiler 20.

ST4: Simultaneously with the admission of the 10 liters of excrement 7 into the evaporation boiler 20 the electric heater 22 at the bottom of the evaporation boiler 20 is switched on to eliminate the excrement 7 by evaporation under the action of heat. The thermal evaporation results in the generation of stench and vapors.

After ST3 and ST4 have been repeated (9–10 times) in a continuous operating cycle, the discharge valve 24 is opened in order to remove residues that have been deposited in the evaporation boiler 20, with the residues being collected via the residue discharge pipe 25 in the residue receiving basket 26. The residues collected in the residue receiving basket 26 are recovered during inspection.

ST5: The process of ST3–ST4 is repeated by using nighttime electricity.

Thus, When the upper limit sensor of ST3 has detected excrement 7 and said excrement 7 is re-fed from the fluidizing type toilet tank 10 to the evaporation boiler 20 said excrement 7 is evaporated under the action of heat.

ST6: The stench and vapors generated in ST4 are passed through the first deodorizing pipe 30 and the vapors flow with the stench as warm water (cold water) into the filtration tank 40.

ST7: The warm (cold) water that has flown into the filtration tank 40 is deodorized by effective microorganisms and filtered for reuse as recycled water. This recycled water is thereupon reused as flushing water for flushing the toilet 2 and as the filtration water for the first deodorizing pipe 30.

ST8: The stench of filtration tank 40 is deodorized by passing through the second deodorizing pipe 43 and flowing to the first discharge pipe 50 and the deodorized air is circulated by being sucked by air blower 75.

This concludes the purification cycle of excrement 7.

When the thermo-evaporative type toilet system 1 in accordance with this invention is installed, for example, in a company it can be used continuously during the working time (that is to say, within the maximum time for which it can be used) by some 50–60 persons and the excrement 7 can be treated even when the collected excrement 7 has not reached the predetermined amount and evaporated by heating with nighttime electricity to reduce its volume to the predetermined amount (that is, the volume detected by the lower level sensor).

Even when, during nighttime use, the excrement 7 disintegrated in ST2 above has not accumulated to the predetermined level it is possible to transfer the excrement 7 to the evaporation boiler 20 by operating the sewage water pump with nighttime electricity.

Furthermore, effective microorganisms have been provided in the filtration tank 40 for purifying the sewage water, and the range of effective microorganisms that can be used is not limited to the BSK strain mentioned above by way of example, with other means of sewage purification also being usable.

As stated herein above, the thermo-evaporative type toilet system in accordance with claim 1 is designed so that the excrement is disintegrated to a predetermined size in the fluidizing type toilet tank and the disintegrated excrement collected in the evaporation boiler for evaporation thereof in the evaporation boiler under the action of heat. Wherefore it is possible to evaporate excrement under the action of heat in an efficient manner without requiring significant time as the excrement that has been disintegrated to the predetermined size need only be heated for evaporation in the evaporation boiler.

Since, as a result, the time during which the evaporation boiler is maintained in the empty condition is relatively long it follows that when the fluidizing type toilet tank is full with excrement it is possible to send the excrement immediately to the evaporation boiler from the fluidizing type toilet tank. As a result, the toilet system offers greater ease and convenience of use since it is possible to use the toilet for defecation and urination at any time necessary.

Furthermore, it is also possible to inject air bubbles into the excrement while softening the excrement through the addition of water thereto, in accordance with claim 2.

Moreover, it is possible to disintegrate the excrement to the predetermined size in an efficient manner since said excrement is caused to revolve along the peripheral walls of the container.

Further, the fluidizing type toilet tank has a long-life durability because the fluidizing type toilet tank is not subject to damage due the use of water for stirring the excrement.

It is possible, in accordance with claim 3, to evaporate excrement under the action of heat in an efficient manner without the deposition of residual excremental matter since the excrement that has been disintegrated in the fluidizing type toilet tank is supplied to the evaporation boiler.

Furthermore, it is possible to achieve long-life durability for the evaporation boiler since said evaporation boiler is not liable to damage as there is no need for the use of steel spheres for stirring the excrement.

It is possible, in accordance with claim 4, to extend the application range of the system by replacing the toilet with a hopper.

Explanation of Symbols

1. Thermo-evaporative toilet system
2. Toilet
3. Discharge pipe
4. Butterfly shutter
7. Excrement
10. Fluidizing type toilet tank
11. Container
11a. Peripheral walls
12. Sewage water recycling pump
13. Circulation circuit
13a. Spray aperture in circulation circuit
14. Receiving basket for foreign matter
15. Sewage water feed pump
16. Feed pipe
75. Air blower
20. Evaporation boiler
21. Boiler unit
21a. Inner boiler
21b. Outer boiler
21c. Oil
22. Electric heater
23. Water shutter
24. Discharge valve
25. Residue discharge pipe
27. Residue volume detection sensor
28. Flushing pipe
29. Air feed pipe
30. First deodorizing pipe
31. Cylinder 32. Air feeding pipe
33. Metal filter
34. Cooled water feed pipe
40. Filtration tank
41. Container
43. Second deodorizing pipe
44a. Outer cylinder
44b. Inner cylinder
45. Space
46. Water feed pipe
47. Pipe
48. Metal filter
49. Air feed pipe
49a. Discharge outlet of air feed pipe
50. First discharge pipe
51. Outer cylinder
51a. (Atmospheric) Air suction hole
52. Lower inner cylinder
52a. Bottom end of lower inner cylinder
52b. Top end of lower inner cylinder
53. Metal filter
55. Upper inner cylinder
55a. Bottom end of upper inner cylinder
55b. Top end of upper inner cylinder
57. Air feed pipe
58. Lid
59. Condensation return pipe
60. Second discharge pipe
61. Fan
62. Activated carbon
65. Water feed pump
66. Suction pipe
67. Radiator
70. Return pipe
71. Water storage tank
75. Air blower
76. Air feeding pipe
80. Activated carbon

What is claimed is:

1. What is claimed is a thermo-evaporative type toilet system characterized in that the thermo-evaporative type toilet system, in which the excrement collected from the toilet is heated for evaporation with generation of malodorous vapors, the malodorous gases are removed from the vapors, the water is regenerated from the vapors and purified to obtain purified water, with said purified water being re-circulated by way of reuse, is provided with a fluidizing type tank in which the excrement collected from the toilet is disintegrated to the predetermined size, an evaporation boiler that accepts the excrement after disintegrating and deodorizing in said fluidizing type tank, and a first deodorizer pipe which accepts the vapors and malodorous gases sent from said evaporation boiler, and a filtration tank at the front-end of said first deodorizing pipe, while a second deodorizing pipe designed to discharge the air in the filtration tank and a first and second discharge pipe are provided at the front-end of the filtration tank and a return pipe designed to return the water in the filtration tank to said toilet is connected to the filtration tank in such a manner that effective microorganisms capable of removing the malodorous substances are introduced into the aforesaid fluidizing type toilet tank.

2. What is claimed is a thermo-evaporative type toilet system in accordance with claim 1 herein above characterized in that in the aforesaid fluidizing type tank the excrement is stored in a cylindrical container and disintegrated to a predetermined size by spraying the excrement and water from the walls of said container causing said excrement and water to revolve along the walls of said container.

3. What is claimed is a thermo-evaporative type toilet system in accordance with claim 1 herein above characterized in that the excrement disintegrated in said fluidizing type toilet tank is stored in the aforesaid evaporation boiler and the stored excrement is evaporated by heating.

4. What is claimed is a thermo-evaporative type toilet system in accordance with claim 1 herein above characterized in that the aforesaid toilet is replaced with a hopper.

* * * * *